(12) United States Patent
Brewer

(10) Patent No.: US 6,517,153 B1
(45) Date of Patent: Feb. 11, 2003

(54) ALL WEATHER PROTECTIVE INFANT CARRIER COVER/ACTIVITY CENTER

(76) Inventor: Marvelee Brewer, 812 W. Cypress, Bloomfield, NM (US) 87413

(*) Notice: Subject to any disclaimer, the term of this patent is extended or adjusted under 35 U.S.C. 154(b) by 0 days.

(21) Appl. No.: 09/798,687

(22) Filed: Mar. 2, 2001

Related U.S. Application Data

(60) Provisional application No. 60/186,622, filed on Mar. 3, 2000.

(51) Int. Cl.[7] .............................. A47C 29/00; A47C 7/66
(52) U.S. Cl. .............................. 297/184.13; 297/184.1; 297/184.11; 297/184.15; 297/184.17
(58) Field of Search .................. 297/184.13, 184.1, 297/184.11, 184.15, 184.17

(56) References Cited

U.S. PATENT DOCUMENTS

| | | | |
|---|---|---|---|
| 1,143,774 A | 6/1915 | Nicholls | |
| 1,257,206 A | 2/1918 | Fernbach | |
| 1,291,191 A | 1/1919 | Semple | |
| 1,412,935 A | 4/1922 | Greenebaum | |
| 1,735,521 A | 11/1929 | Young | |
| 2,037,216 A | 4/1936 | Echlin | |
| 2,648,565 A | 8/1953 | Kennedy et al. | |
| 3,007,735 A * | 11/1961 | Cohn | 297/184.17 |
| 3,241,160 A * | 3/1966 | Escobar | 297/184.17 X |
| 3,717,374 A | 2/1973 | Pearce | |
| 3,799,606 A | 3/1974 | Gesslein | |
| 3,860,980 A | 1/1975 | Ebert | 5/121 |
| 4,579,385 A | 4/1986 | Koenig | 297/184.13 |
| 4,583,779 A | 4/1986 | Myers | 297/184.13 |
| 4,733,906 A | 3/1988 | Davis et al. | 297/184.13 |
| 4,761,032 A * | 8/1988 | Sanchez et al. | 297/184.13 X |
| 4,785,838 A * | 11/1988 | Negahdari | 297/184.13 X |
| 4,810,030 A * | 3/1989 | Lewis | 297/184.13 X |
| 4,865,380 A * | 9/1989 | Heitzman-Powell | 297/184.13 |
| D305,085 S | 12/1989 | Gyebnar | |
| 4,915,120 A * | 4/1990 | Ziolkowski | 297/184.17 X |
| 4,946,221 A | 8/1990 | Livingston | 297/184.13 |
| 4,978,166 A * | 12/1990 | James | 297/184.13 X |
| 5,074,616 A | 12/1991 | Smith | 5/116 X |
| 5,184,865 A | 2/1993 | Mohtasham et al. | 135/88.02 |
| 5,309,586 A | 5/1994 | Sies et al. | 297/184.13 X |
| 5,322,343 A * | 6/1994 | Parker et al. | 297/184.13 X |
| 5,437,061 A | 8/1995 | Kenner | 297/184.13 X |
| 5,449,014 A | 9/1995 | Yan-ho | 135/95 |
| 5,522,639 A | 6/1996 | Jaime | 297/184.13 |
| 5,549,354 A | 8/1996 | Rosen | 297/184.13 |
| 5,730,490 A | 3/1998 | Mortenson | 297/184.13 |
| D395,372 S | 6/1998 | Simpson | |
| D396,207 S | 7/1998 | Berkey | |
| 5,806,924 A | 9/1998 | Gonas | 297/184.13 X |
| 5,956,767 A | 9/1999 | Imm | 2/69.5 |
| 6,012,184 A | 1/2000 | Childers | 5/629 X |
| 6,012,189 A | 1/2000 | Dudley | 5/655 |
| 6,012,756 A | 1/2000 | Clark-Dickson | 297/184.13 X |
| 6,019,421 A | 2/2000 | Roh | 297/184.13 |

FOREIGN PATENT DOCUMENTS

WO    WO97/27788    8/1997

\* cited by examiner

Primary Examiner—Rodney B. White
(74) Attorney, Agent, or Firm—Morriss, Bateman, O'Bryant & Compagni

(57) ABSTRACT

An all weather protective cover for infants includes a cover which is configured for mounting on an infant carrier. The cover preferably has an inner cover layer and an outer cover layer. The inner layer forms mesh windows, while the outer layer selectively covers the windows. The cover also preferably includes a mechanism for holding toys in front of an infant to keep the infant entertained while within the cover.

23 Claims, 15 Drawing Sheets

ALL WEATHER PROTECTIVE INFANT CARRIER COVER/ACTIVITY CENTER

BACKGROUND OF THE INVENTION

1. Related Applications

The present invention claims the benefit of U.S. Provisional Patent Application No. 60/186,622, filed Mar. 3, 2000 which is expressly incorporated herein by reference.

2. Field of the Invention

The present invention relates to an all weather cover for infant carriers/activity centers. More particularly, the present invention relates to a cover to protect an infant regardless of the weather, while providing ready access to the infant within the cover.

3. State of the Art

There are a number of reasons for which a cover is desired to protect an infant in a carrier or portable bed. One common situation which faces infants is that of the sun shining directly into the infant's face. While most adults and children can change their head position and/or position a visor to block the sunlight, an infant is often unable to move his head, or to otherwise shield his eyes from the sunlight.

While many infant carrier provide a sun visor which can be pulled to partially cover the infant's face, the repeated changes of direction of the automobile will often prevent the visor from being effective for this purpose. Thus, there is a need for a cover which will shield an infant from the glare of the sun while traveling in a car. Additionally, such a visor should be able to be used with the carrier or a portable bed when the carrier is removed from the automobile.

Yet another problem common with automobiles is the existence of flies and other insects which may enter the automobile if a window is left open. Flies or other insects can often carry diseases which can harm the infant. Most covers which are commonly available on the market, however, provide no protection to the infant from such insects. Additionally, other insects such as wasps and bees may sting an infant and may cause serious health problems if the child allergic to bee stings or wasp stings.

Still another concern with infant carriers is that the child is not protected from the wind or precipitation if he or she is removed the car. While within a car, an infant will generally not be tightly bundled in a blanket or have a coat on due to the concerns of the child overheating. However, as soon as the vehicle stops and the door is open, the child is subject to cold weather, rain, snow, etc. Thus, it is desirable to have a cover for an infant carrier which will protect the child from the elements without the need for dressing and undressing the child every time the child is moved into and out of the vehicle.

Still another concern for parents of young children is unwanted touching. Often strangers or friends will approach an infant and play with the infants hands or face. While the strangers, etc., are generally well meaning, any germs on their hands will be communicated to the child. When the child places his hands in his mouth, the germs will be ingested. A well meaning stranger or friend can readily communicate a cold, the flu, or other infections to the child. Thus, it is desirable to provide a cover which inhibits the ability of others to touch the infant without the express consent of the parent.

Still yet another concern which is common for parents of infants while riding in a car seat is that the infant may easily become bored and begin to cry. Numerous accidents have been caused by a driver attempting to look at or touch an infant to calm them when agitated. While infants can often be entertained with various toys, an uncovered infant carrier allows the toy to fall or be thrown from the carrier. To return the toy to the carrier, the driver must usually take his or her eyes off the road, thereby increasing the likelihood of an accident.

The ability to entertain a child is particularly important when the infant carrier is covered with netting or some other type of cover. Because the visibility of the infant is limited by the cover, there must be adequate visual stimulation to keep the child's attention for a prolonged period of time.

Thus, it is desirable that a cover for infant carriers and the like be provided with a row of toys or entertainment that are positioned in front of the child and which will not accidently be removed from the carrier while driving.

Numerous attempts have been made to protect infants from the sun and to otherwise provide entertainment to the child. One common device for shielding children from sun is a small round sun screen which sticks to a window. However, each screen only blocks the sun from one direction. When the vehicle changes direction, the sun's direct rays come through the window from a different location or from a different window altogether. Not only does the sun screen not work at keeping the sun out of the infant's eyes, it obstructs the driver's view somewhat and has to be removed altogether at night.

While using a blanket draped over the sun visor canopy in front of the infant's face works great at keeping the sun out of the infants's eyes, the driver must keep an eye on the blanket to make sure it does not slide down on to the infant's face and smother him.

One invention exists which claims to protect an infant from weather and insects while seated in any type of infant carrier. U.S. Pat. No. 5,730,490 was designed to utilize the handle of the infant carrier to support the carrier cover and form a tent over the carrier. The main disadvantage to this type of cover is that it cannot be used in a moving vehicle as the manufacturers of infant carriers suggest the handle be locked in place in the horizontal position behind the carrier. Therefore, it provides limited protection from the sun or insects while in a moving vehicle. It also does not provide a means for keeping the attention of a child. Young infants may not grasp a toy or have the ability to search for a toy that has fallen on his lap. Once the toy is dropped, he is no longer able to entertain himself with the toy.

Other inventions exist which protect an infant from the sun while the infant is seated in an infant carrier. U.S. Pat. No. 5,522,639 incorporates the use of dual sun shade devices which attach to the U-shaped handle. U.S. Pat. No. 4,997, 231 also requires the use of the U-shaped handle for attachment of the sun visor and only covers half of the carrier allowing incomplete sun protection. Neither of the above referenced inventions can be utilized in a moving vehicle for the same reason noted above for U.S. Pat. No. 5,730,490.

U.S. Pat. No. 5,007,674 does not require the use of the U-shaped carrier handle and could thus be used in a moving vehicle. However, its use appears to be dependent upon fasteners which must be attached to the carrier cover by the consumer. It is also a single function device. It does not protect against precipitation, wind or insects. It also does not entertain the infant.

U.S. Pat. No. 5,411,315 incorporates a toy bar for entertaining purposes, but it is an entirely different type of infant seat. It is not a car seat. While it could be used out of doors, it provides little protection against insects, sun, wind or precipitation.

In short, there is a need for a car seat cover which protects a seated infant from sun, wind, precipitation and insects both inside and out of a moving vehicle, and which enables ready entertainment of the infant.

SUMMARY OF THE INVENTION

Thus, it is an object of the present invention to provide an improved cover for an infant carrier and the like.

It is another object of the present invention to provide such a cover which protects and infant from sun, insects and weather conditions.

It is yet another object of the present invention to provide a cover which can be used while a vehicle is in motion and which does not interfere with proper mounting of a child carrier to its base.

It is still yet another object of the present invention to provide such a cover which provides for entertainment of a child while the child is disposed beneath the cover.

The above and other objects of the present invention are achieved by an all weather protective infant carrier cover/activity center formed by an inner cover and an outer cover and a support bar disposed within the cover independent of the handle of the carrier to maintain the form of the cover without interfering with use of the handle for carrying or for locking the carrier into its base for use in a moving car.

By providing a inner cover and an outer cover, the invention protects a infant in several ways. It provides protection from insects, sun, wind and precipitation; and discourages unwanted touching of the infant by strangers, thus preventing the transmission of germs by touch to the infant who does not have a fully developed immune system.

The construction of the cover, also facilitates the formation of an entertainment/activity area immediately in front of the infant to provide entertainment for the infant both inside and out of a moving vehicle.

The cover is preferably composed of washable, breathable textile materials. Preferably, the inner cover is formed of mesh netting, while the outer cover is preferably a water resistant/repellant textile material. (While non water-resistant/repellant textile material could be used. Protections from precipitation cannot be achieved without a water resistant material.) The perimeter of the cover has elastic edging which enables it to fit many brands of carriers.

The center of the cover has a wrap-around fastening structure which adjusts to fit the sun visor canopy U-shaped support member which is included on many brands of carriers. While the U-shaped support member is traditionally used for holding a sun visor, the present invention uses the same device to hold the over away from the child. This is highly advantageous because it does not require modification of the carrier to add a support member and does not interfere with the use of the handle for either carrying the carrier or locking the carrier into a base unit when used in an automobile.

The outer cover forms a built-in sun visor flap on one side composed of washable breathable textile fabric (preferably water resistant). Beneath the flap is the inner cover formed by a washable mesh, netting or other appropriate material which is both see through and allows air to flow through. When lowered, the flap of the outer cover provides protection from sunlight. When raised, air can flow through to cool the infant if desired, and the infant can be easily viewed.

The side of the outer cover opposite the built-in sun visor has a built-in weather flap composed of the same textile fabric as the sun visor flap. When in the down position, the weather flap protects the infant from sun, wind and precipitation. (The down position is only recommended for short periods of time, i.e., going between a vehicle and inside a building in inclement weather. The reason for this precaution is that air flow is limited to the air that circulates under the draped edges of the textile fabric. The weather flap was designed to drape over the carrier to allow some air flow, unlike the sun visor flap which is fitted to the carrier.)

When the weather flap is rolled up to the top of the carrier, a mesh-type material is exposed (just like that under the sun visor flap) allowing optimal air flow to the seated infant. The weather flap can also be raised just half-way up providing adequate sun protection to the infant seated in the infant carrier in the back seat of a vehicle while allowing adequate air flow to prevent the infant from becoming to warm on a sunny day. The weather flap can also be pulled back over the built-in sun visor flap to provide additional ventilation on very hot days.

In one embodiment of the invention, in the rolled up position, the weather flap can be fixed in place with the two straps which are attached to the top of the cover, at the juncture of the two sides, over the sun visor canopy U-shaped support mechanism. Thus, the weather flap can be held out of the way without the risk that the weather flap will be lost or damaged.

The mesh under the weather flap side serves several functions. Counter tension is needed to keep the center plastic visor support mechanism (part of the infant carrier) in place. The mesh provides this tension while allowing air to circulate. The mesh also keeps insects from disturbing the infant. And, because the infant is totally enclosed in his/her own little protective shell, he/she is not easily accessible to touching by strangers or other well meaning people. Thus, people (and animals) can easily "look but not touch."

Both sides of the carrier have a flexible support structure made of plastic tubing or other appropriate material which arches over the seated infant so the cover does not sit directly on the infant. These plastic support pieces can be removed for machine washing of the cover and reinstalled.

At the juncture of the two sides are a plurality of straps which hang down under the sun visor canopy U-shaped support member and over the seated infant. The plurality of straps can be used to hang toys which are held a short distance from the infant's face. The straps have a velcro, snap or other appropriate closure device and are adjustable to various lengths to accommodate the infant as he grows. Small toys which have a loop-type structure or hole through which the above reference straps can be threaded can be hung above the seated infant. Because the toys are not a permanent fixture, they are detachable and can be interchanged as age appropriate for the intellectual development of the infant. Or, the infant's own toys can be attached if they have a loop-type structure/hole. Unlike simply handing the infant a toy which may get thrown, dropped or otherwise lost, the straps hold the toys in a position where they can be played with but not readily removed by the infant.

Because the cover supports are flexible, elbow carrying of the infant carrier is possible without the interference which comes from using a cover which is supported by the handle as shown in U.S. Pat. No. 5,730,490. Additionally, because the support for the cover is independent of the handle, the cover can be used without interfering with the handle serving as a locking mechanism as is common with many types of infant car seats, etc.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1:
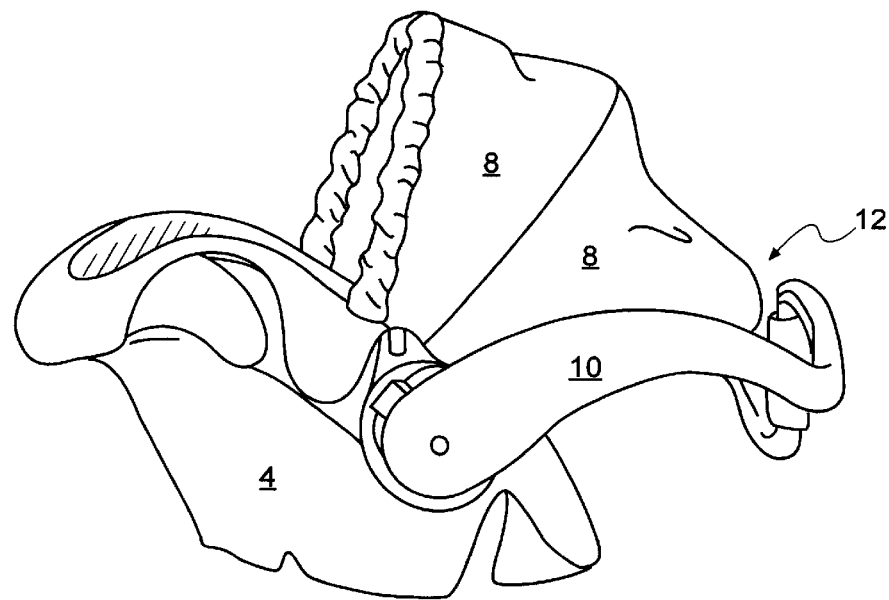
FIG. 1 is a side perspective view of an infant carrier with adjustable detachable sun visor canopy made in accordance with the principles of the prior art.

Referring to FIG. 1, there is shown an infant carrier 4 with a sun visor canopy 8 attached to the head 12 of the carrier. The sun visor 8 can be extended into the position shown, or can be retracted toward the head 12 of the carrier 4 by simply pushing or pulling on the sun visor. It should be noted that the sun visor 8 does not interfere with use of the handle 10 of the carrier 4.

Figure 2:
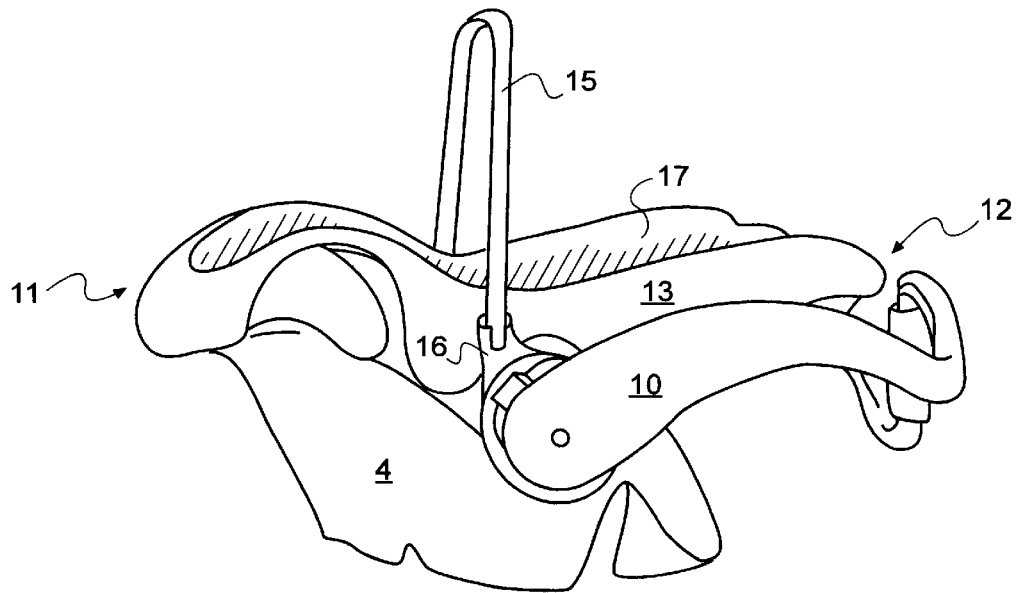
FIG. 2 is a side perspective view of the infant carrier in FIG. 1 with the detachable sun visor canopy removed so that the sun visor support member is exposed.

Turning now to FIG. 2, there is shown the same infant carrier as FIG. 1 with the sun visor canopy 8 removed leaving the sun visor canopy support member 15 in place in the sun visor canopy support member holder 16. In the drawing, 11 indicates the foot of the carrier, 12 the head of the carrier, 17 is the inside/seat of the carrier, 13 is the seat cover, and 10 is the adjustable handle of the carrier.

Those familiar with the prior art seat covers will appreciate that the support member 15 can generally be removed from the support member holder 16 by simply lifting the support member upwardly. Thus, it is relatively easy to remove the sun visor 8 from the carrier 4.

Figure 3:
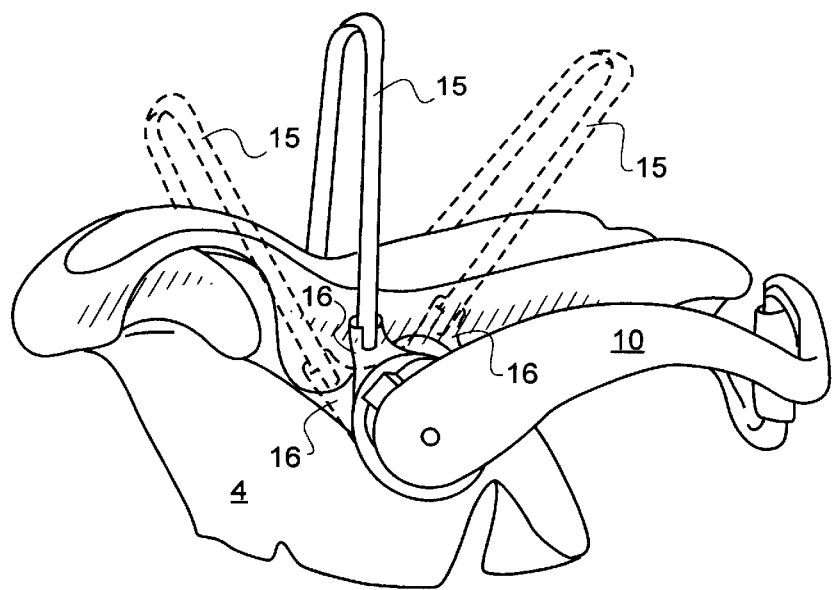
FIG. 3 is a view of the infant carrier in FIG. 2 showing the adjustability of the sun visor canopy support mechanism.

FIG. 3 illustrates the same infant carrier view as FIGS. 1 and 2, but also depicts the adjustability of the sun visor support member 15 and holder 16. The dotted lines show the support member positioned adjacent the head and feet of the carrier 4. As will be explained in additional detail below, the ready adjustability of the support member 15 enables the present invention to provide numerous advantages over the prior art configurations discussed in the background section above.

Figure 4:
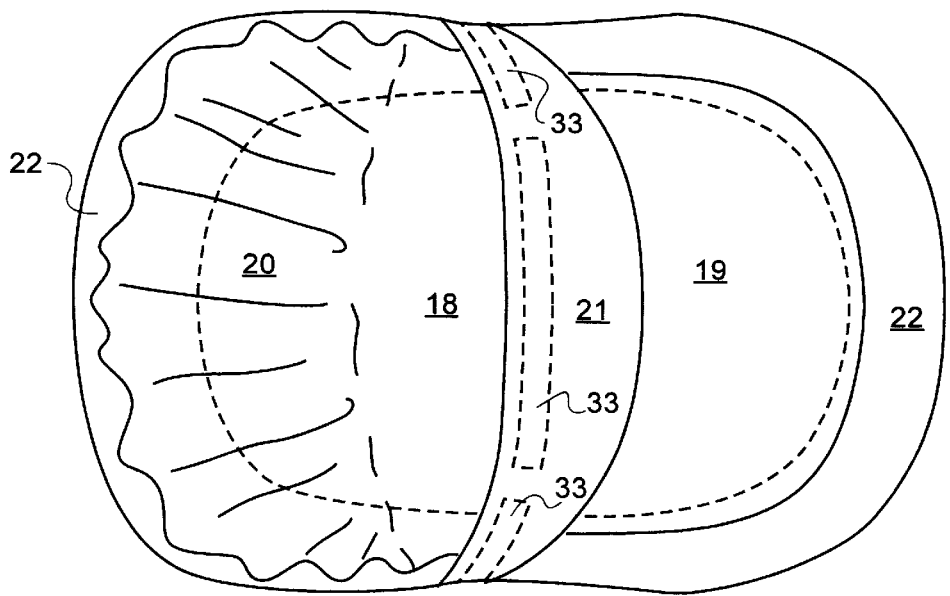
FIG. 4 is a top perspective view of one embodiment of a cover formed in accordance with the principles of the present invention, with the perimeter lying flat without the elastic/drawstring installed.

FIG. 4 is a top view of the cover 18 of the present invention without the perimeter elastic/drawstring installed. The cover 18 does not lay flat over the carrier 4. Rather, it is fit to form a tent-like structure with a generally oval shaped perimeter. The cover 18 is formed by an outer cover layer formed by a weather flap 20, panel 21, and a sun visor flap 19. All are preferably formed of light weight, washable, breathable, non-shear (opaque), water resistant/repellant textile fabric.

Positioned below the outer cover layer is an inner cover layer, only the frame 22 portion of which is visible in FIG. 4. The sun visor flap 19 lays flat against a mesh-type window below it, overlapping the window frame 22. The dotted line indicates the edge of the window frame 22 which is hidden by the sun visor flap 19 on one side and the weather flap 20 on the other side. The weather flap 20 is typically not form fit and drapes over the mesh type window below it. The view of the mesh-type windows is obstructed by the sun visor flap 19 and the weather flap 20 when both flaps are in the down position as depicted in this FIG. 4.

The panel 21 typically does not have a mesh-type window beneath it. This is because a more durable fabric is needed for attachment of the wrap-around structure 33 (as depicted by the dotted lines on panel 21) used for installing the cover 18 to the infant carrier via the sun visor canopy support mechanism on the under side of cover 18. Thus, those skilled in the art will appreciate that references to the outer cover layer and the inner cover layer does not mean that the two are separate pieces throughout their entirety.

Figure 5:
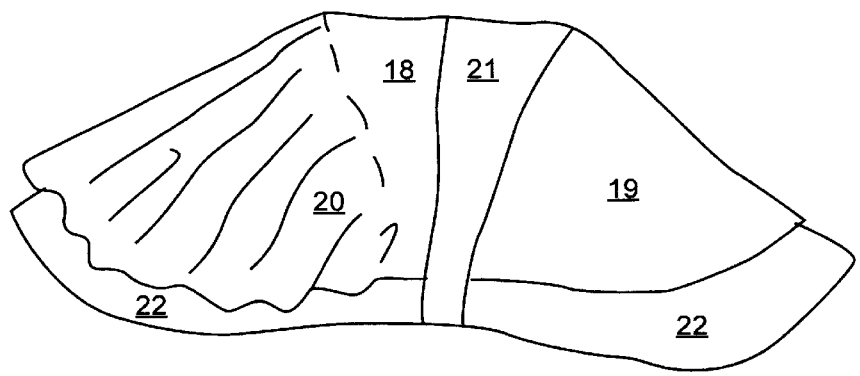
FIG. 5 is a side view of the embodiment of the cover of FIG. 4 with the perimeter lying flat without the elastic/drawstring installed.

Turning now to FIG. 5, there is shown a side view of the cover 18 shown in FIG. 4. The view of FIG. 5 gives an idea of the general tent-like shape of cover 18 without the elastic/drawstring installed as viewed from the side. Weather flap 20 connects with panel 21 adjacent the mid-line of the cover, comprising one half of the cover. Sun visor flap 19 and panel 21 comprise the other half of the outer cover layer of the cover 18.

The inside edge of window frame 22 of the inner cover layer joins the mesh-type windows (not shown) on both halves of the cover and runs the full circumference of the cover except for two small sections on either side where panel 21 interrupts it. A casing in which to house the elastic is sewn on the outer edge of 22 (including the small sections of 21) to form the perimeter of the cover 18.

Figure 6:
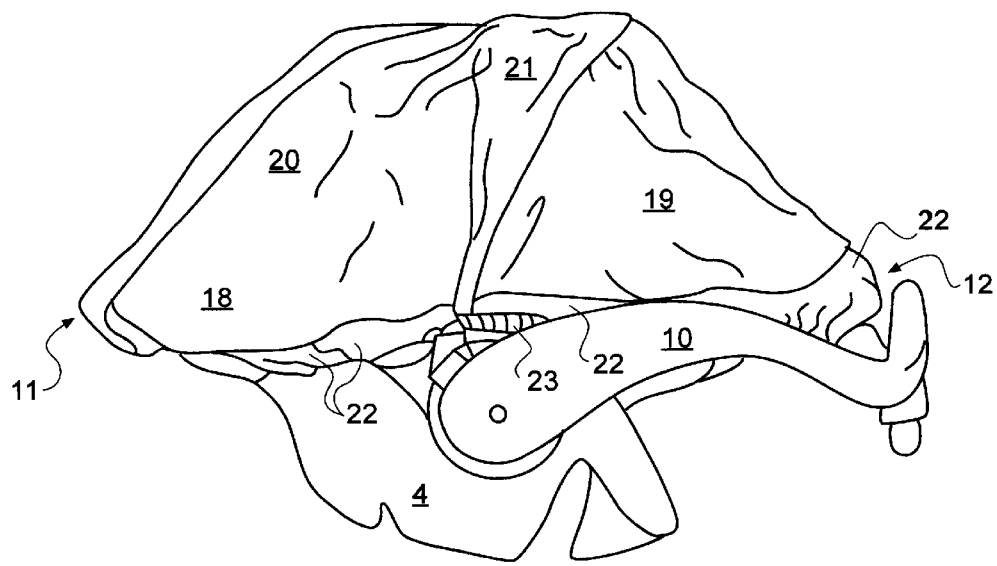
FIG. 6 is a side view of the first embodiment of the cover in its place on the infant carrier with the elastic/drawstring installed, the handle of the infant carrier being in the horizontal locked position whereby the infant carrier may be secured to a base unit in an automobile.

FIG. 6 depicts a side view of cover 18 with the elastic/drawstring installed and the cover mounted on an infant carrier. With flaps 19 and 20 in the down position as depicted in this drawing, the cover 18 protects the seated infant from sun, wind, precipitation and insects. With the elastic/drawstring 23 installed on the perimeter of cover 18, the cover fits snugly over the infant carrier and cannot be blown off by wind. Only a small section of the elastic/drawstring 23 can be viewed as most of it is underneath the infant carrier and the view hidden by window frame 22. Weather flap 20 is oriented to the foot 11 half of the infant carrier, while panel 21 and sun visor flap 19 are oriented to the head 12 half. The cover 18 could be turned around such that weather flap 20 was oriented to the head 12 half and panel 21 and sun visor flap 19 oriented to the foot 11 half. However, the former example is used for the purposes of explaining the invention in all drawings herein.

Figure 7:
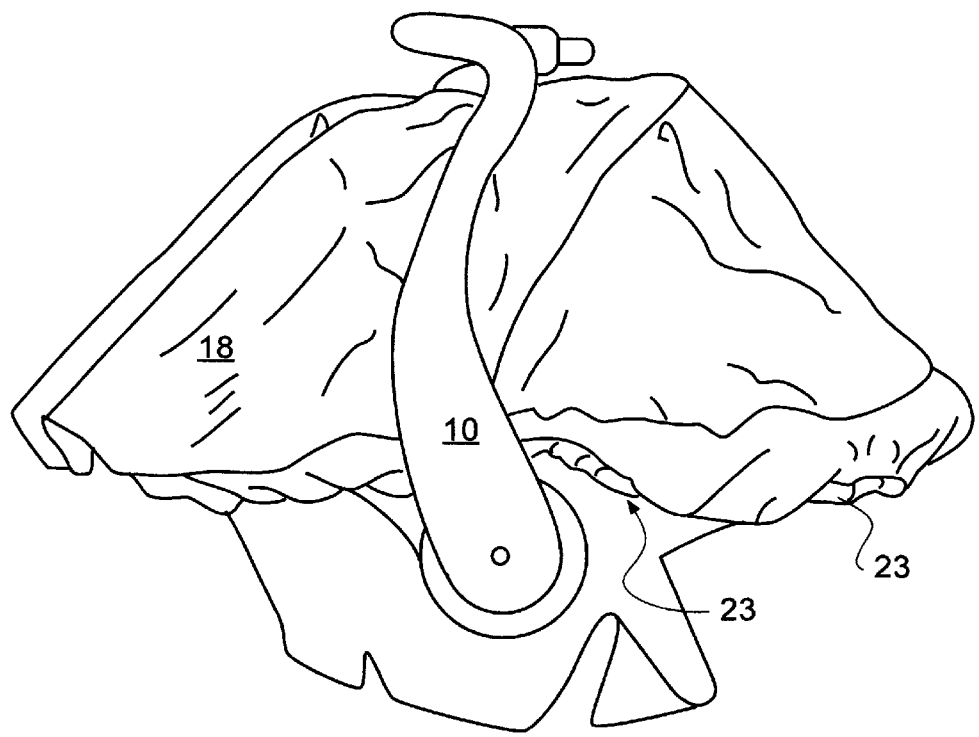
FIG. 7 is a side view of the embodiment of the cover similar to that shown in FIG. 6, with the handle of the infant carrier in the vertical, carrying position.

FIG. 7 shows the same view as FIG. 6 except with the carrier handle 10 in the vertical locked position. An important aspect of the present invention is the ability of the handle 10 to move independently from cover 18. In this position, elbow carrying is permitted as the support structures for cover 18 are all flexible allowing an arm to be slipped between handle 10 and cover 18. With handle 10 in the vertical position, parts of the elastic/drawstring perimeter 23 can be viewed more clearly. When the carrier 4 is desired to be placed in an automobile, it can be mounted in a base, not shown, and the handle 10 rotated down into the position shown in FIG. 6 to thereby lock the carrier into the base. Those skilled in the art will appreciate that prior art configuration which use the handle 10 as a structural support cannot be used in this fashion without significantly adjusting the cover.

Figure 8:
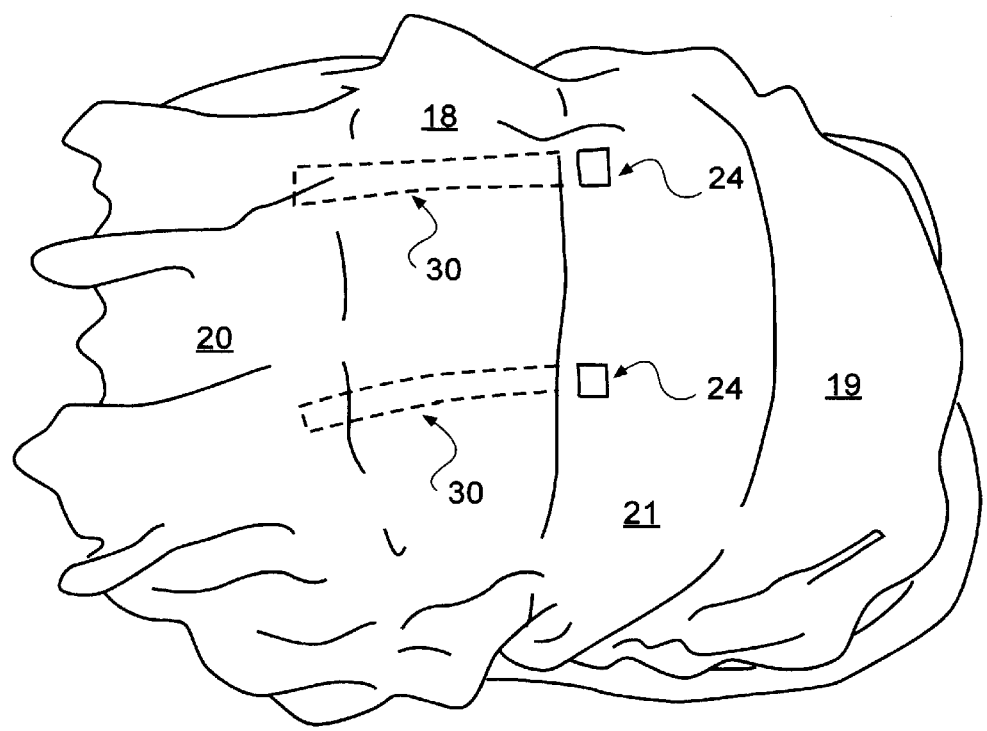
FIG. 8 is a top perspective view of the embodiment of the cover shown in FIG. 6 in its place on the infant carrier, elastic/drawstring installed, the handle of the infant carrier in the horizontal locked position.

FIG. 8 illustrates a top perspective view of cover 18, delineating panel 21 and the two flaps 19 and 20. Velcro fastening devices 24 are attached atop the cover 18 along the center line for purposes of securing weather flap 20 to the top of the invention utilizing anchor straps 30 to which the other side of the velcro closures are attached. (See FIG. 13 to see how weather flap 20 is secured on top of the cover.) The dotted lines show that anchor straps 30 are under weather flap 20. They are sewn into the seam that connects panel 21 to weather flap 20. The other end of each anchor strap 30 has the velcro fastening device.

Figure 9:
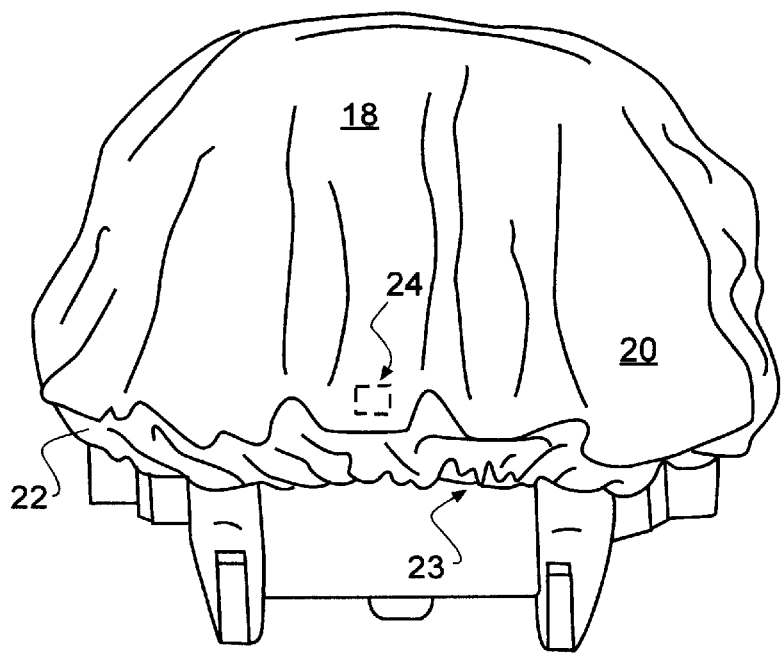
FIG. 9 is the end view of the embodiment of the cover in FIG. 6 with the weather panel in the down position and the handle of the infant carrier in the horizontal locked position.

FIG. 9 depicts a foot end view of cover 18, showing how weather flap 20 drapes over the structure overlapping the window frame 22, completely covering the mesh-type window beneath it. A velcro, hook and loop type fastener 24 attaches the under side of weather flap 20 to window frame 22 to keep the flap in place in windy weather. While the hook and loop closure device 24 is depicted on the center perimeter of flap 20, there could be more than one velcro or other appropriate closure device 24 at other locations along the perimeter of weather flap 20.

Figure 10:
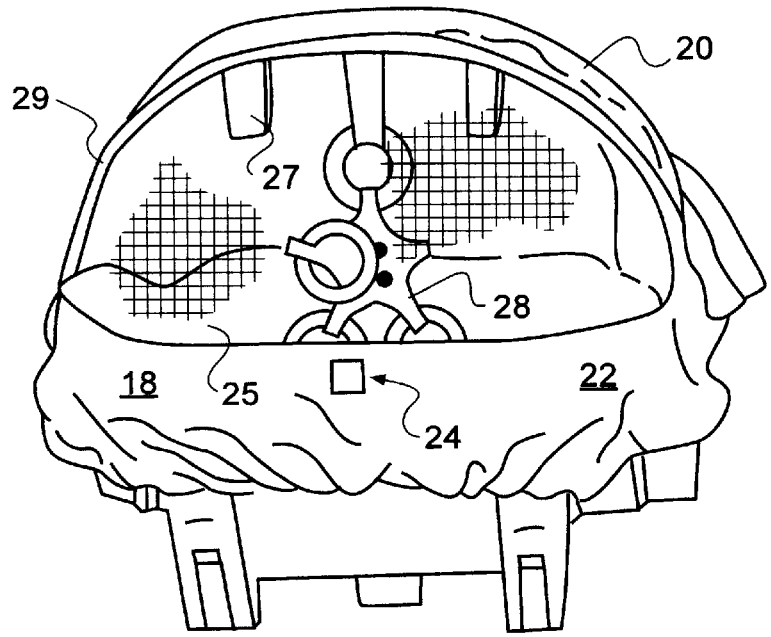
FIG. 10 is an end view of the an embodiment of the cover on the infant carrier, with the weather flap pulled back over the top of the outer cover to expose the mesh-type window in accordance with the present invention.

FIG. 10 depicts the foot end view of cover 18 with the weather flap 20 of FIG. 9 pulled back over the top of the cover 18, under side out, completely exposing the mesh-type window 25 which forms part of the inner cover layer. The mesh window 25 is sewn/attached to the window frame 22. The inside of the carrier (including the infant), the toy straps 27, any toy(s) 28 attached to the toy strap(s) 27 and the flexible support structure 29 can all be viewed through the mesh window.

Figure 11:
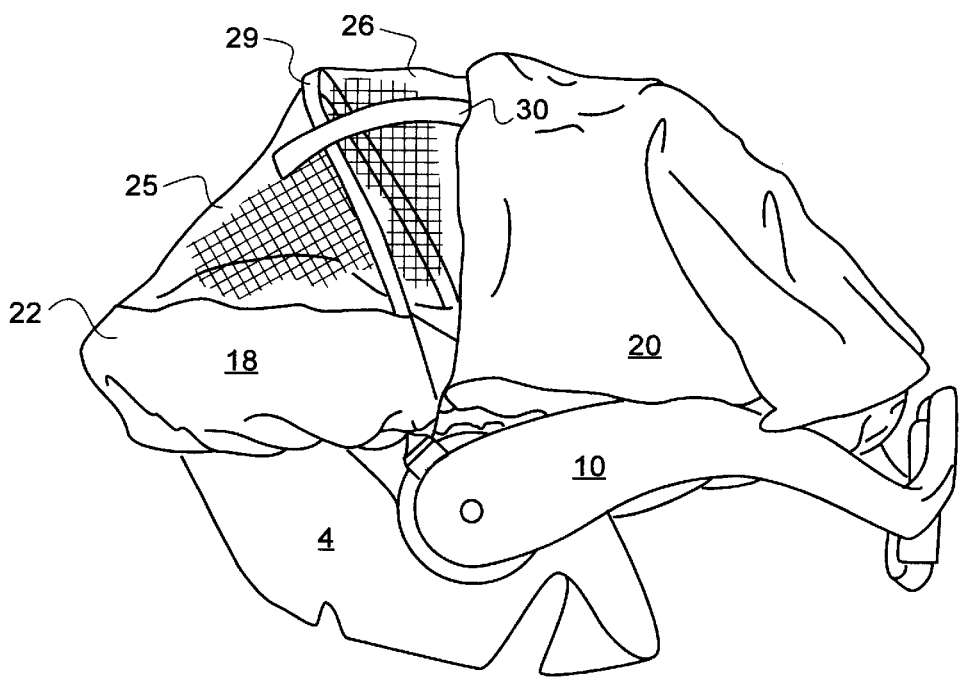
FIG. 11 is a side view of the embodiment of the cover shown in FIG. 10.

FIG. 11 shows a side view of cover 18 with the weather flap 20 pulled back over the top of the invention, under side out, completely exposing the mesh windows 25 and 26 as in FIG. 10. (Mesh window 26 could not be viewed in FIG. 10 because of the angle.) Mesh window 25 attaches to window frame 22. Mesh windows 25 and 26 are joined together by a seam along with a casing which holds a flexible support structure 29. Anchor strap 30 is attached between mesh window 26 and weather flap 20 at the juncture where mesh window 26 and weather flap 20 attach to each other. In this view, only the under side of weather flap 20 is visible.

Figure 12:
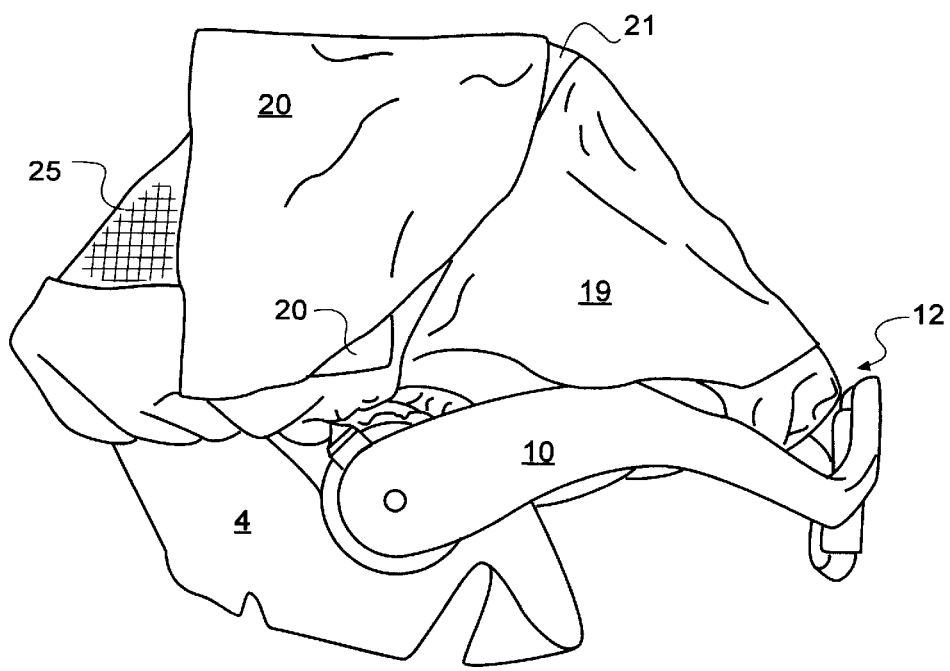
FIG. 12 is a side view of the embodiment of the cover in FIG. 10, with the weather flap lifted halfway back over the top of the cover to partially expose the mesh-type window.

FIG. 12 shows the same view as FIG. 11 except weather flap 20 is pulled only halfway back, exposing only part of mesh window 25. In this view, sun visor flap 19, parts of panel 21 and a small triangular shaped corner of the outside of weather flap 20 can be seen. In this position, weather flap 20 provides almost total protection from the sun's direct rays while the infant carrier is installed in the back seat of a vehicle. This is because the head of the carrier 12 is slightly inclined when installed in its base (not shown) in the vehicle and the back seat of the vehicle blocks some of the sun's rays. Weather flap 20 can be adjusted to any length between fully up (FIG. 11) or fully down (FIG. 6). The position in which weather flap 20 is depicted in FIG. 12 is the ideal position for riding in a vehicle because it provides both abundant air flow to the infant through mesh window 25 and adequate protection from the sun's direct rays.

Figure 13:
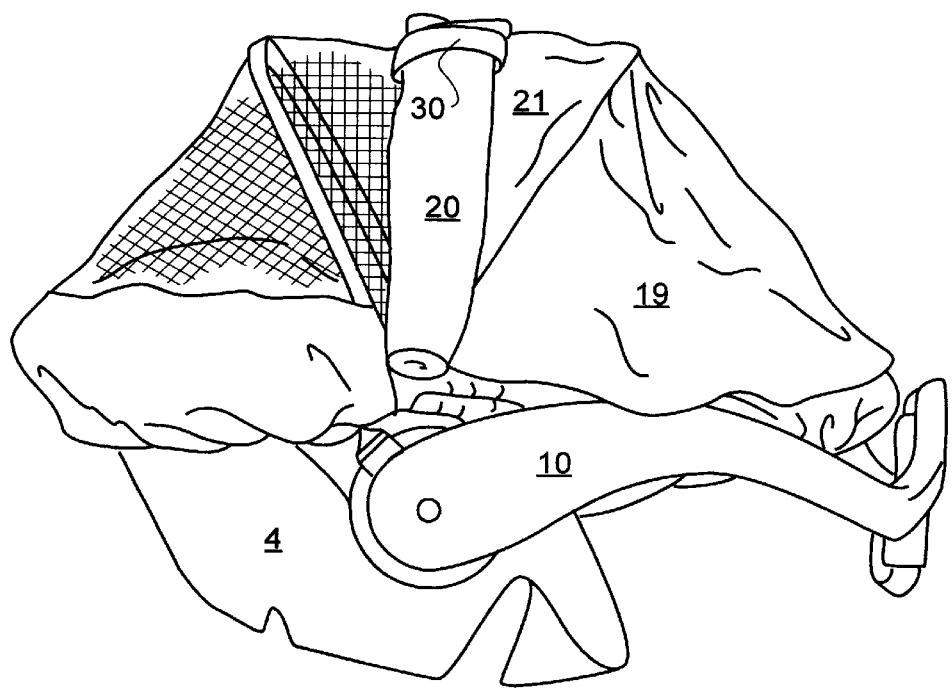
FIG. 13 is a side view of the embodiment of the cover in FIG. 10 with the weather flap rolled back and secured at the top of the cover to fully exposed the mesh-type window and secure the weather flap of the outer cover.

FIG. 13 is identical to FIG. 11 except weather flap 20 is rolled up on top of the cover and anchored in place utilizing anchor straps 30 and because weather flap 20 is not pulled back over panel 21 and sun visor flap 19, both parts 19 and 21 can be viewed. The under side of weather flap 20 is depicted in the rolled up position in this view.

Figure 14:
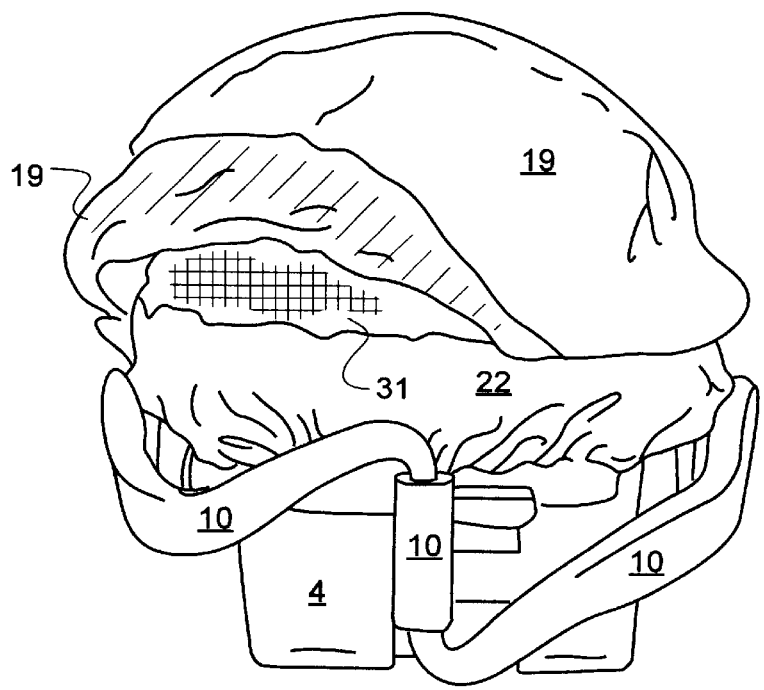
FIG. 14 is a front end view of an embodiment of the cover wherein the bottom end of sun visor flap is lifted to expose the mesh-type window under the sun visor flap.

FIG. 14 illustrates sun visor flap 19 in the partially raised position. The angled parallel lines indicate the under side of sun visor flap 19. This view shows that mesh window 31 attaches to window frame 22 under sun visor flap 19. The top view of infant carrier handle 14 can be seen in this illustration.

Figure 15:
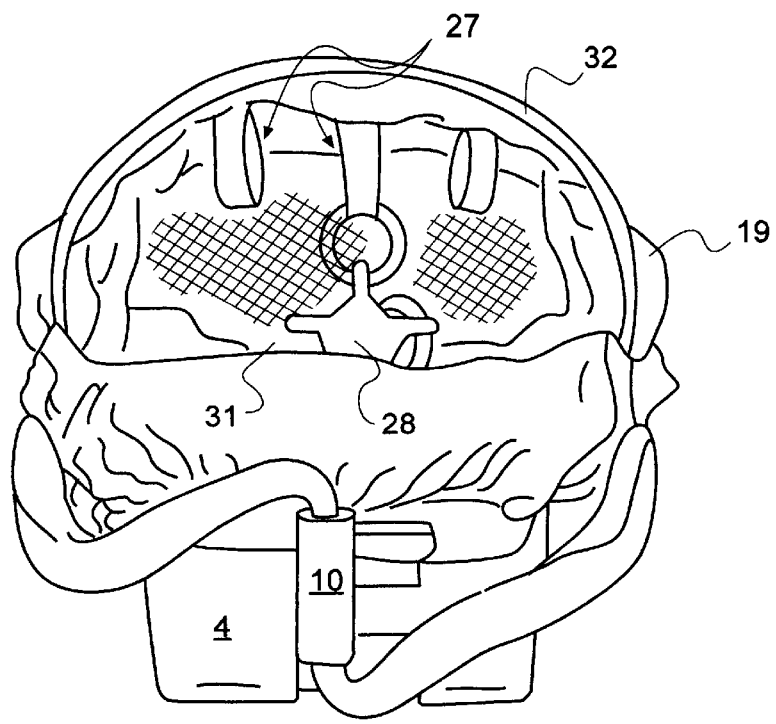
FIG. 15 is a front end view of a cover wherein the sun visor flap is lifted back over the top of the cover to fully expose the mesh-type window of the inner cover.

FIG. 15 is the same view of the cover as depicted in FIG. 14, except weather flap 19 is pulled back over the top of the cover fully exposing mesh window 31. As in FIG. 10, the toy 28 and toy straps 27 can be viewed but from the side opposite of that depicted in FIG. 10. Flexible support structure 32 (the counter part to flexible support structure 29) can also be seen from this view.

Figure 16:
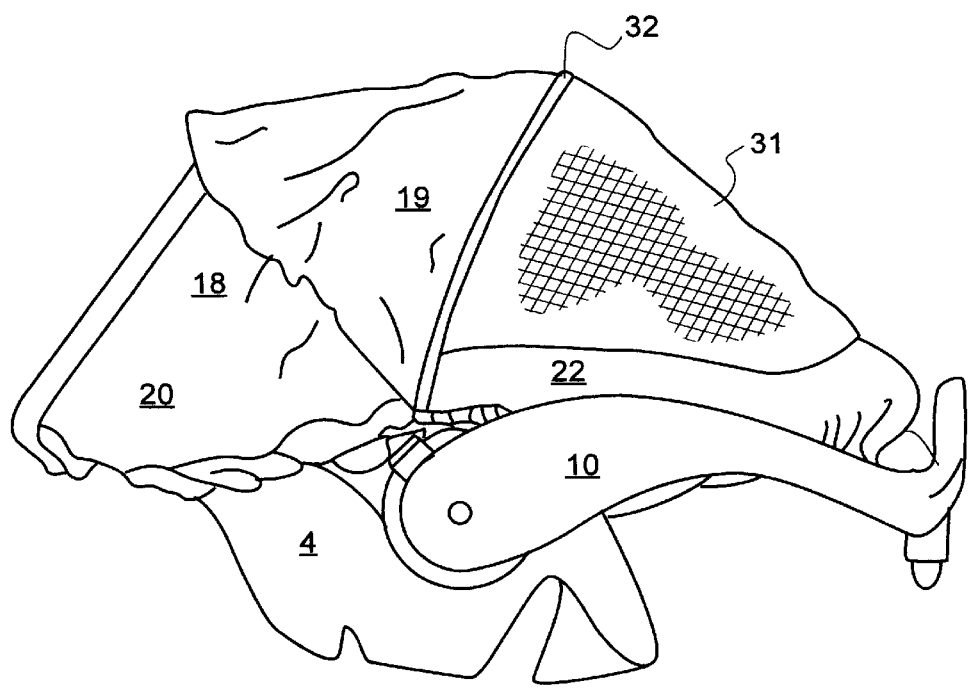
FIG. 16 is a side view of the cover shown in FIG. 15.

FIG. 16 is the same embodiment as FIGS. 14 and 15 except from a side view. In this view, the under side of sun visor flap 19 can be seen pulled back over the top of cover 18, exposing to view flexible support structure 32, mesh window 31 and window frame 22. Mesh window 31 and sun visor flap 19 are joined together by a seam along with a casing which holds the flexible support structure 32. Weather flap 20 is in the down position.

Figure 17:
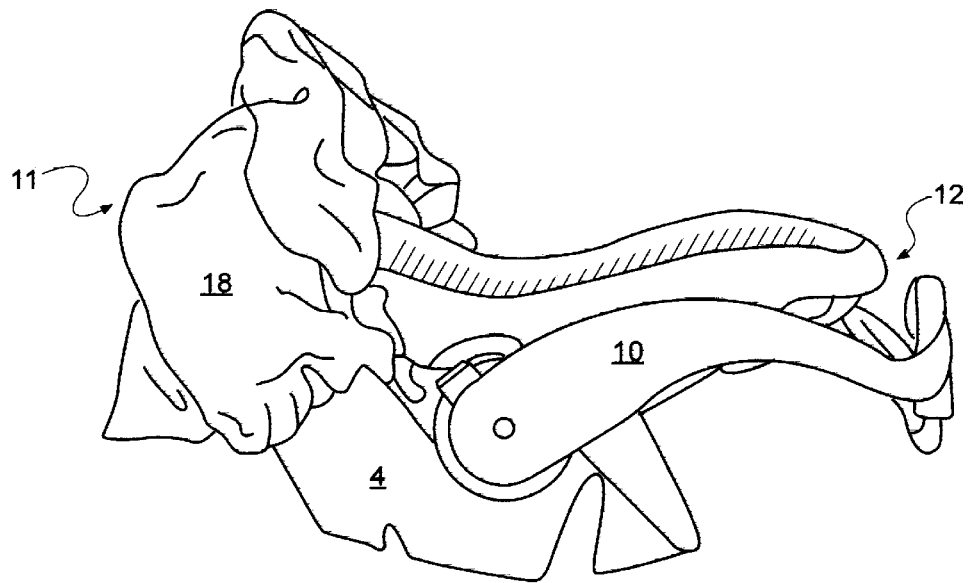
FIG. 17 is a side view of the cover in its place on the foot of the infant carrier with the elastic edge of the sun visor end of the cover pulled up over the flexible support, the cover collapsed to the foot of the carrier, and the handle of the infant carrier being in the horizontal locked position.

FIG. 17 shows cover 18 in the collapsed position at the foot 11 of the infant carrier. In this view, the elastic perimeter that was stretched over the head 12 of the infant carrier in FIG. 6 has been pulled back over the flexible support structure which was pushed toward the foot of the infant carrier, collapsing the cover. The elastic perimeter that is stretched over the foot end of the infant carrier remains in place. In this position, the seated infant can easily be removed from the infant carrier. This is the desired position for removing the infant because any toys attached to the cover (FIGS. 10 and 15) fall to the foot of the infant, not to the head.

The ready movement of the cover 18 to either the foot end or the head end of the carrier 4 is facilitated by the movable support member 15 (not shown in FIG. 16).

Figure 18:
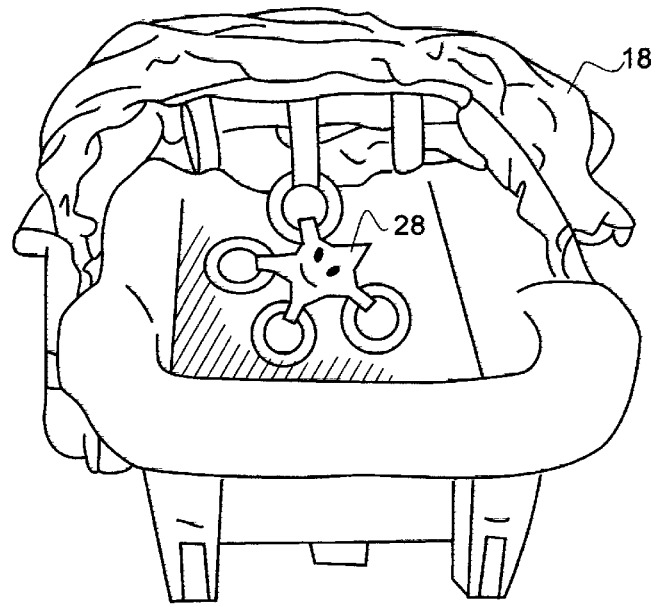
FIG. 18 is an rear end view of the cover in its place at the head of the infant carrier with the elastic edge of the weather flap end of the cover pulled up over the flexible support, the cover collapsed to the head of the carrier, the handle of the infant carrier being in the horizontal locked position.

Turning now to FIG. 18, there is shown a end view of the carrier 4, with the cover 18 in the collapsed position at the head of the infant carrier. In this view, the elastic perimeter that was stretched over the foot of the infant carrier in FIG. 6 has been pulled back over the flexible support structure which was pushed toward the head of the carrier 4, collapsing the cover 18. The elastic perimeter that is stretched over the head end of the carrier remains in place. The toy 28 would be sitting on the infants head if an infant was seated in the carrier. This is not the desired position for seating or removing an infant from the infant carrier as the toy may hit the infant in the head. Thus, it is preferred that the cover 18 be moved down to the foot end of the carrier 4.

Figure 19:
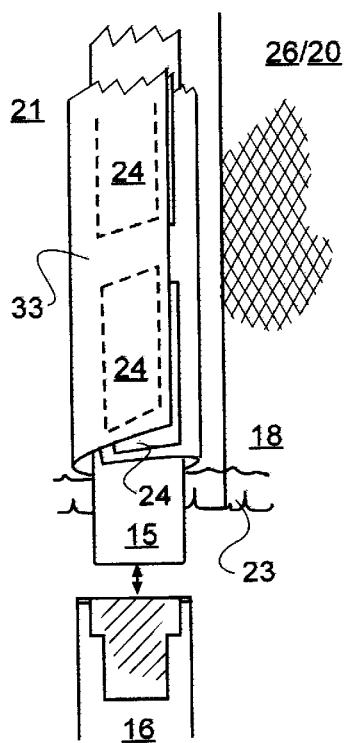
FIG. 19 is a view of the wrap-around structure which attaches the cover to the sun visor canopy support mechanism.

FIG. 19 shows an enlarged view of the wrap around structure which forms an openable channel 33 as mentioned previously regarding FIG. 4. (FIG. 4 shows wrap around structure/openable channel 33 as three separate pieces, however it could be one continuous piece or more than three, so long as it performs the function of attaching the cover 18 to the sun visor canopy support member 15.) In this view, the under side of cover 18 is seen, showing that wrap around structure/openable channel 33 is attached to panel 21 along the seam where panel 21, mesh window 26 and weather flap 20 meet. ("26/20" in the drawing indicates that weather flap 20 can be seen through mesh window 26 from the underside view of cover 18.)

This view shows the end of sun visor canopy support member 15 enclosed by wrap around structure 33 at the elastic perimeter 23 where it attaches to the carrier's sun visor canopy support member 16. Hook and loop fasteners 24 are used to adhere the two sides of the wrap around structure/openable channel 33 together forming a casing for the sun visor canopy support member 15. From the disclosure contained, herein, those skilled in the art will appreciate that the wrap around structure/openable channel 33 is just one way of attaching the cover 18 to the sun visor support member 15 of the infant carrier 4. (Other methods including but not limited to tying, elastic loops or a fixed casing could be used. Additionally, a continuous channel could be used with the sun visor support member 15 be slid into place from one side of the channel.)

The openable, wrap around feature allows for adjustability to the sun visor canopy support mechanism of many brands of infant carriers/car seats, as the hook and loop fastener attachments 24 can adjust the side of the channel to fit a variety of widths and thicknesses for the support member 15. Additionally, it facilitates attachment and removal of the cover 18.

Figure 20:
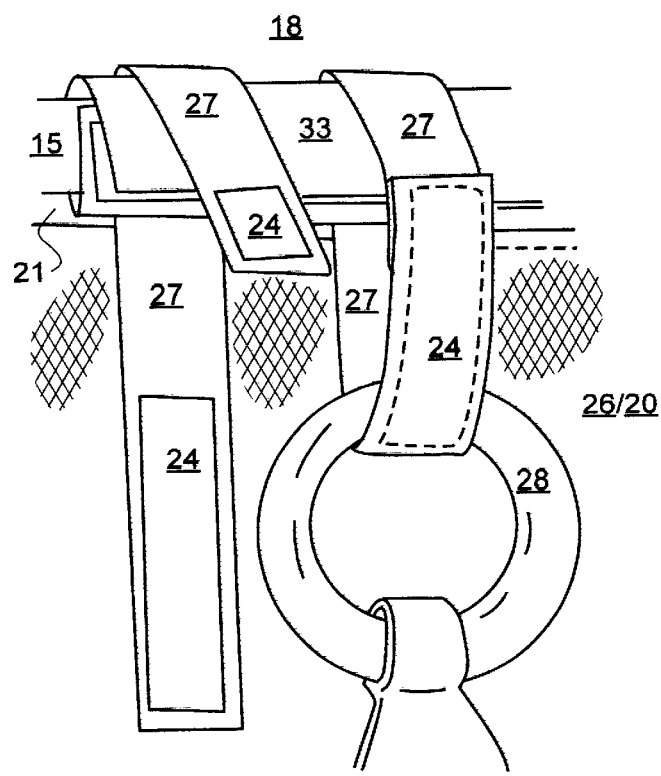
FIG. 20 is an inside view depicting how the toy support straps connect to the inside top of the cover.

FIG. 20 depicts toy strap(s) 27 connected to cover 18 between panel 21 and wrap around structure 33. In this view (as in FIG. 19), the under side of cover 18 is seen, showing that wrap around structure 33 is attached to panel 21 along the seam where panel 21, mesh window 26 and weather flap 20 meet. ("26/20" in the drawing indicates that weather flap 20 can be seen through mesh window 26 from the underside view of cover 18.)

Because toy strap 27 is placed between panel 21 and wrap around structure 33, the weight of the infant pulling on toy 28 is born by sun visor canopy support mechanism 15 and not the seam with which toy strap 27 is attached. Toy strap 27 on the left is open while toy strap 27 on the right is closed around toy 28 with a hook and loop fastener which forms a closure device 24. The dotted line indicates the closure device 24 is on the inside of the strap. This drawing shows two toy straps 27 fairly close together for the purpose of showing one open and one closed in the same view. The actual number and placement of toy straps 27 can be varied.

While the closure devices 24 are indicated as being over the wrap around structure/openable channel 33, the closure devices can be mounted directly around the support member 15. This enables the addition or removal of closure devices 24 as desired. It also makes the cover 18 easier to sew. Furthermore, double-sided hook and loop fasteners may also be used.

Figure 21:
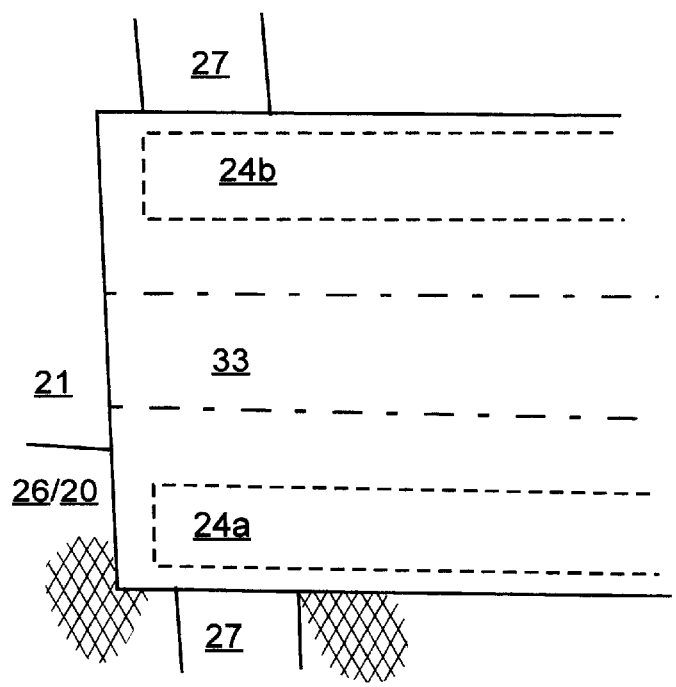
FIG. 21 shows the wrap-around structure depicted in FIG. 20 wide open (flat) position.

Turning now to FIG. 21, there is shown a toy strap 27 underneath wrap-around structure/openable channel 33 and on top of panel 21 and mesh window 26. (Weather flap 20 can be seen through mesh window 26.) Wrap-around structure/openable channel 33 is opened flat. The two parallel broken lines running through the center of wrap-around structure/openable channel 33 indicate stitching, however other appropriate methods of attachment could be used. A hook and loop closure device 24 is used to hold the wrap-around structure/openable channel 33 around the sun visor canopy support mechanism as pictured in FIG. 20. The dotted line shows the hook and loop fastener on the underside of the fabric. The hook and loop closure device 24a is folded in first then closure device 24b can be folded over on top, attaching to closure device 24a.

Figure 22:
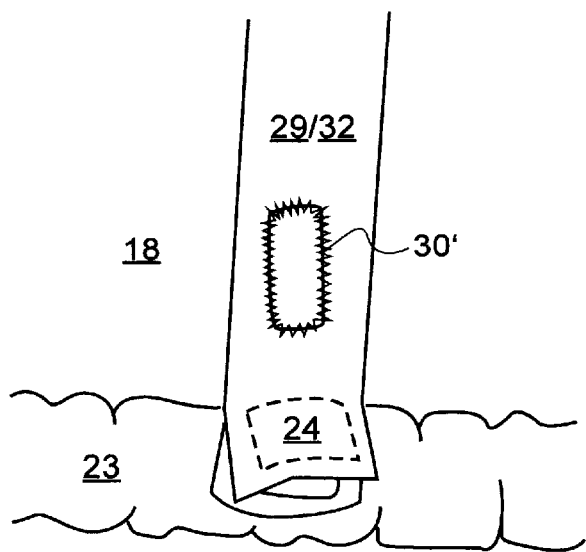
FIG. 22 shows the casing which houses the flexible support structures on either side.

FIG. 22 illustrates the casing used to house flexible support structures 29 and 32. A hook and loop closure device 24 or other appropriate closure device is used on one side of the casing near the elastic/drawstring perimeter 23 to allow the flexible support structures to be removed for laundering.

Alternatively, a button hole 30' can be provided to facilitate installing and uninstalling of the plastic support pieces.

While the descriptions above indicate the preferred materials and attachment methods used in the construction of the invention, those skilled in the art will appreciate that many suitable materials and attachment methods can be used in the construction of the invention. For example, various pieces of the cover could be attached adhesively or by rivets, rather than by sewing.

Additionally, while a light weight, breathable, washable, non-shear (opaque), water resistant/repellant textile fabric is preferred for the parts of the embodiment depicted in FIG. 6, a variety of different materials could be used including but not limited to a soft leather, suede or vinyl. However, these materials are not recommended because they are not very breathable. A non-water resistant/repellant textile material could also be used, but the invention would not be water resistant unless coated with a water repellant substance.

The mesh-like material depicted in the embodiments in FIGS. 10 and 15, respectively, could be constructed of any light-weight mesh, netting or other material which would allow adequate air flow to and visibility of the seated infant. Nylon netting is preferred.

While hook and loop closure devices are preferred wherever illustrated in the drawings, many other closure devices exist such as snap, hook & eye or button closures, etc. Placement and number of such closure devices could also vary from the ones depicted in these illustrations.

The flexible support structures on either side of the cover 18 could be any flexible yet semi-rigid material. However, a flexible plastic material such as plastic tubing (the kind used for air conditioner hoses) is preferred because it is not as likely to break or dent as would a metal, plexiglass or non-flexible plastic support piece. It is bendable but bounces back into shape.

Elastic is preferred for installation in the perimeter of the device, but a drawstring or other device which closes the perimeter of the invention around the infant carrier would work. Elastic is preferred because it allows for quick, easy installation to and removal from the infant carrier. The illustrations herein show the elastic installed in a casing which was sewn around the perimeter of the cover. However, there are other methods which could be used for installing the elastic.

Figure 23:
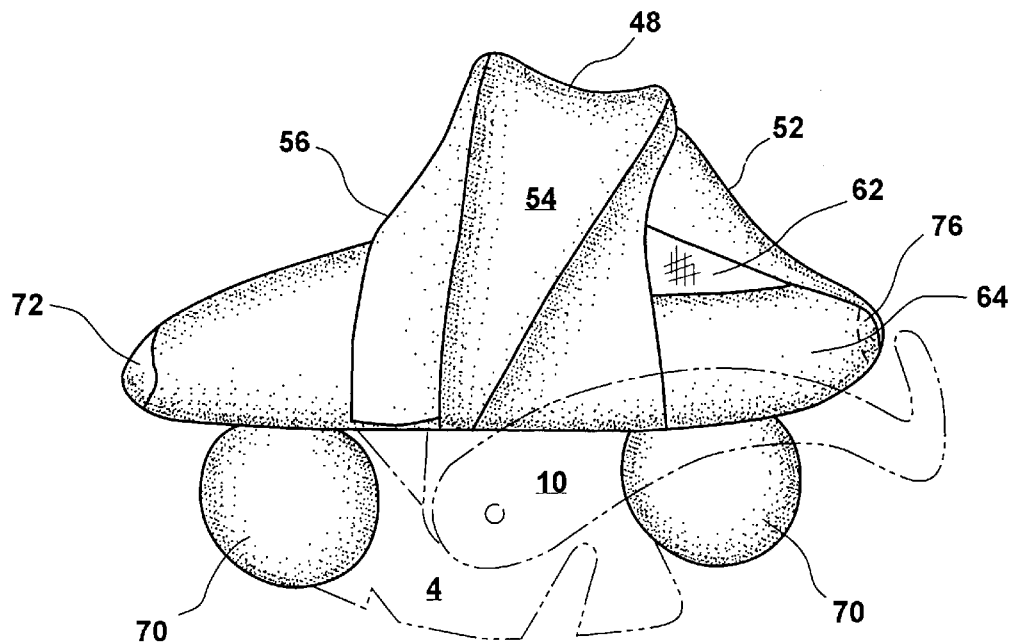
FIG. 23 shows a side view of yet another embodiment of the resent invention.

FIG. 23 shows a side view of yet another embodiment of the present invention. As with the previous embodiment, the cover 48 includes an outer cover layer 50 which is formed by the weather flap 52 the center panel 54 and the sun visor flap 56. The cover 48 also includes the inner cover layer 60 which includes the netting 62 and the frame 64.

In addition to the similar portion, the cover 48 also includes a plurality of appendages 70. As shown in FIG. 23, the appendages 70 are formed to look like tires, thereby giving the cover 48 the look of an automobile. While the appendages 70 may be merely decorative, the appendages preferably form pockets which can be used to store small toys, diapers, wipes, etc. To further enhance the automobile-like appearance of the cover 48, different color fabrics, or silk screening or the like, can be used to simulate headlights 72, etc. Additionally, a pocket 76 can be formed on rear of the cover 48 to hold folded portions of the cover, toys, etc., when not in use.

Figure 24:
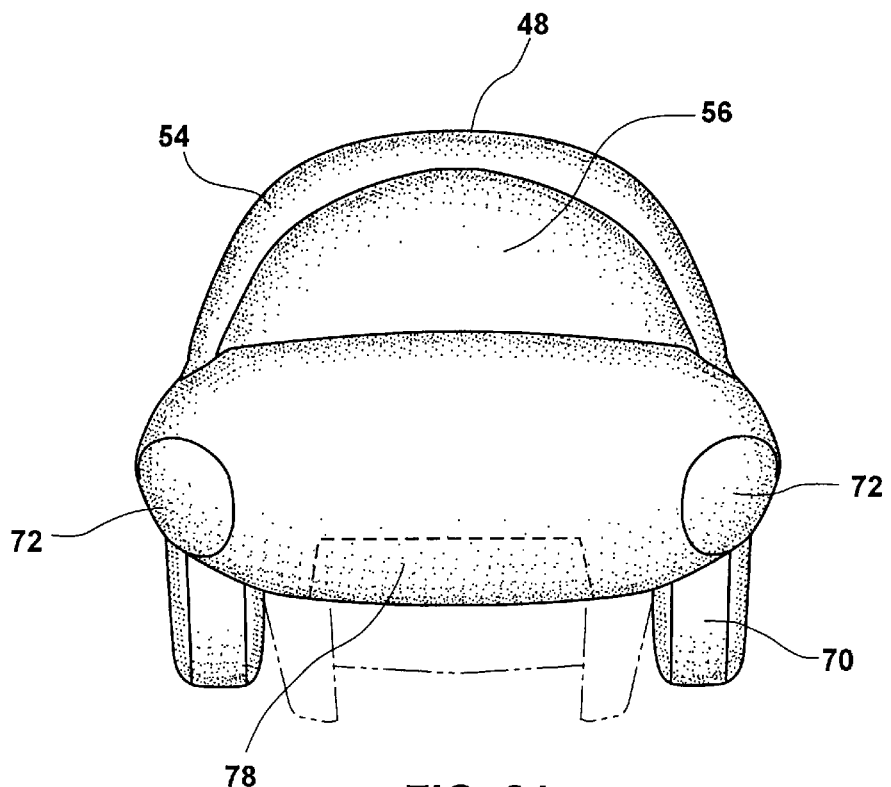
FIG. 24 shows a front view of the embodiment of FIG. 23.

FIG. 24 shows a front end (foot) view of the cover 48 so as to show the headlights 72 and a front pocket 78 of the cover. Those skilled in the art will appreciate that the sun visor flap 56 can be small so as to fold down like a windshield, or can cover substantially the entire from of the cover 48.

Figure 25:
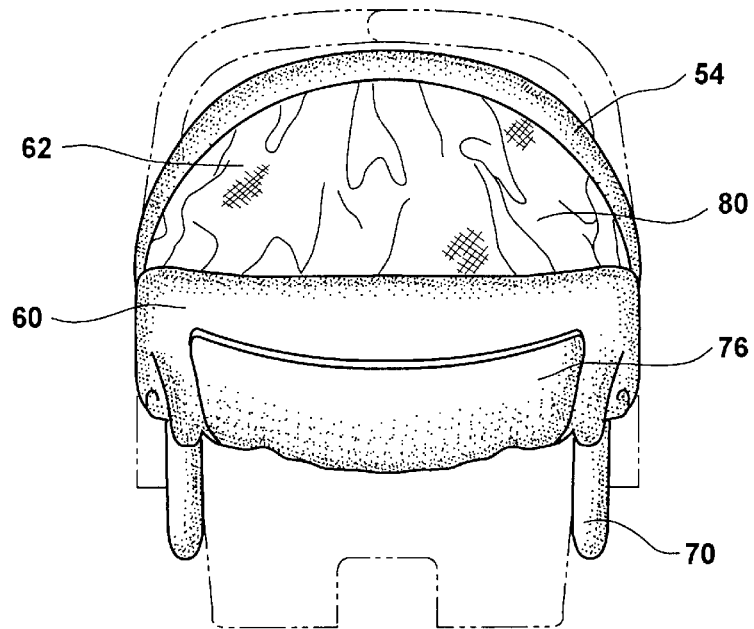
FIG. 25 shows rear view of the embodiment of FIG. 23.

FIG. 25 shows rear view of the embodiment of FIG. 23 with the weather flap 52 of the cover 48 pulled down into an open position and stored in the pocket 76 to reveal the netting 62 of the inner cover layer 60 which forms a rear mesh window 80. As will be apparent, the weather flap 54 in the embodiment shown is attached at the bottom of the flap, instead of the top, as discussed in previous embodiments. The weather flap 54 could also be fully detachable.

Figure 26:
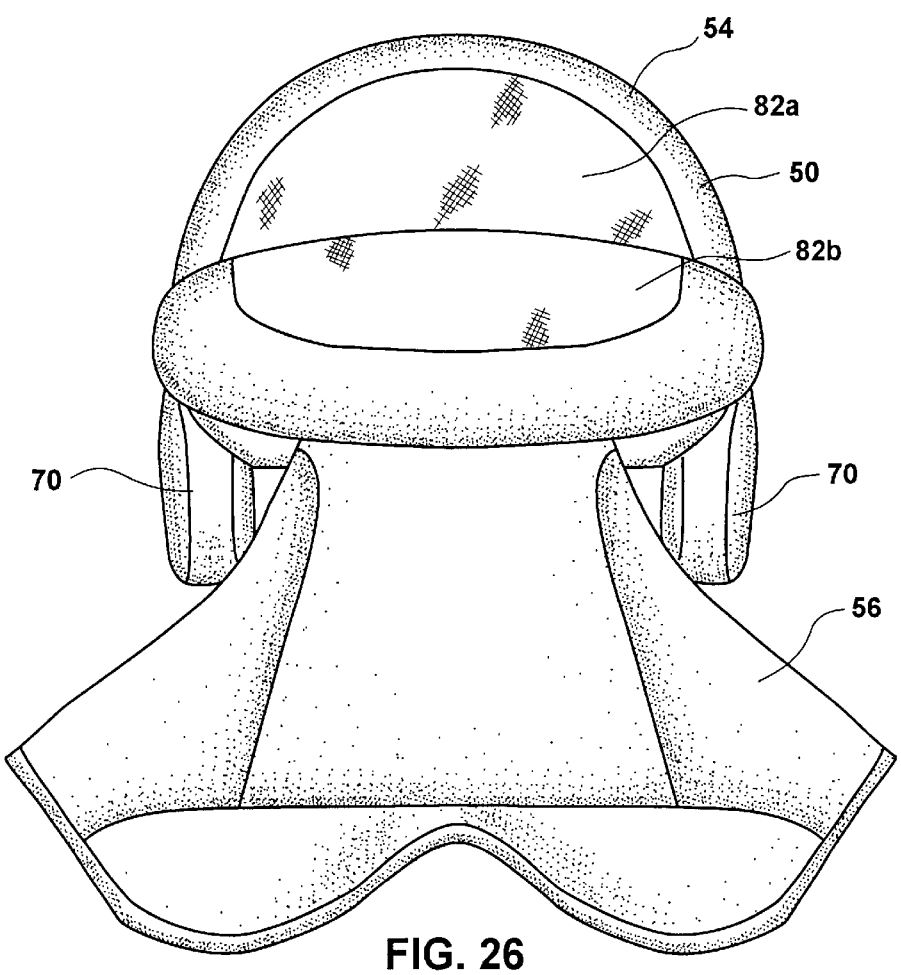
FIG. 26 shows a front view of the embodiment of FIG. 23, with the sun visor flap of the outer cover being pulled down.

Likewise, FIG. 26 shows a front view of the embodiment of FIG. 23, with the sun visor flap 56 of the outer cover layer 50 being pulled down into a fully open position to expose a pair of front windows 82a and 82b. Typically the sun visor flap 56 will be tucked into the pocket 78 shown in FIG. 24 to keep it out of the way.

Figure 27:
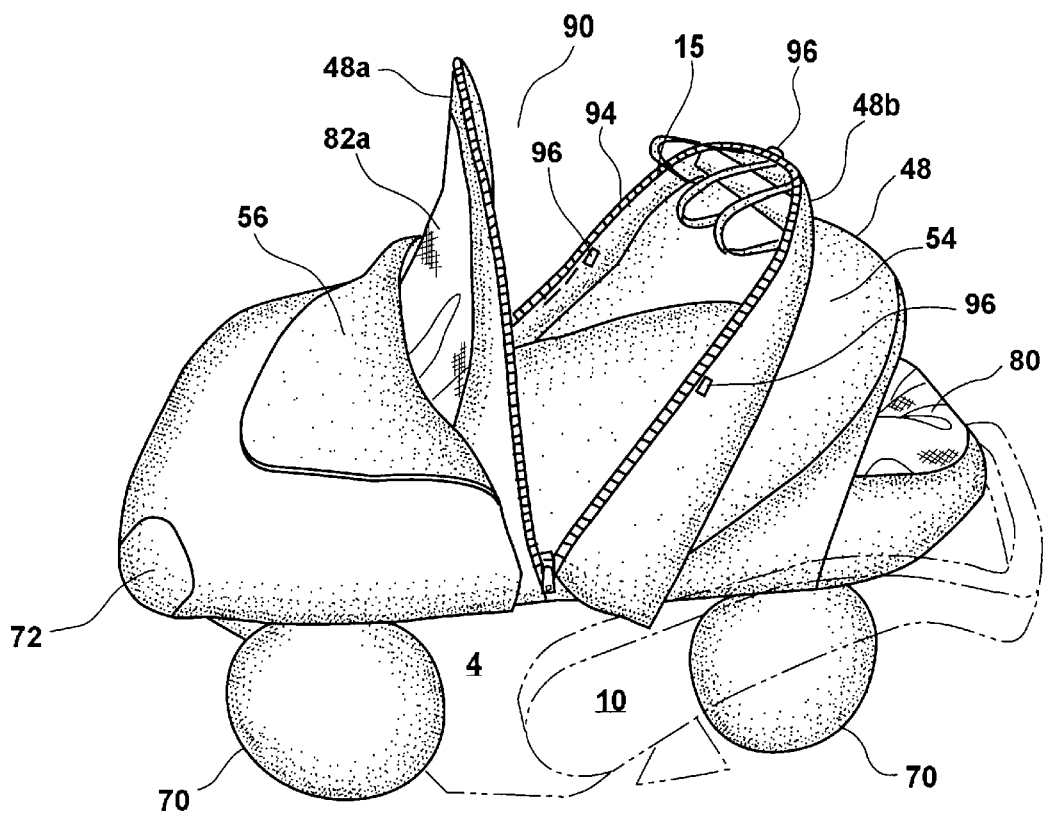
FIG. 27 shows a side perspective view of the embodiment of FIG. 23 with a central opening open to provide access inside the carrier.

One advantage of attaching the weather flap 52 and the sun visor flap 56 at the base of the cover 48 rather than the top, is that it facilitates opening of the cover in the middle. Thus, FIG. 27 shows a side perspective view of the embodiment of FIG. 23 with a central opening 90 which allows a front portion 48a and a rear portion 48b of the cover to separate and thereby form an opening to provide access inside the carrier 4. Preferably, the central opening is formed by an elongate slit 92 which may be closed by a zipper 94 or hook and loop fastener 96. The central opening 90 is preferably formed adjacent to and slightly forward of the support member 15. When the central opening is opened, a parent, etc., is provided almost complete access to the interior of the carrier 4. However, by simply zipper or otherwise closing the central opening 90, the infant can be readily enclosed under the cover. If desired, the central portion 54 can be configured to cover the central opening 90 when the zipper 94 is closed as shown in FIG. 28.

Figure 28:
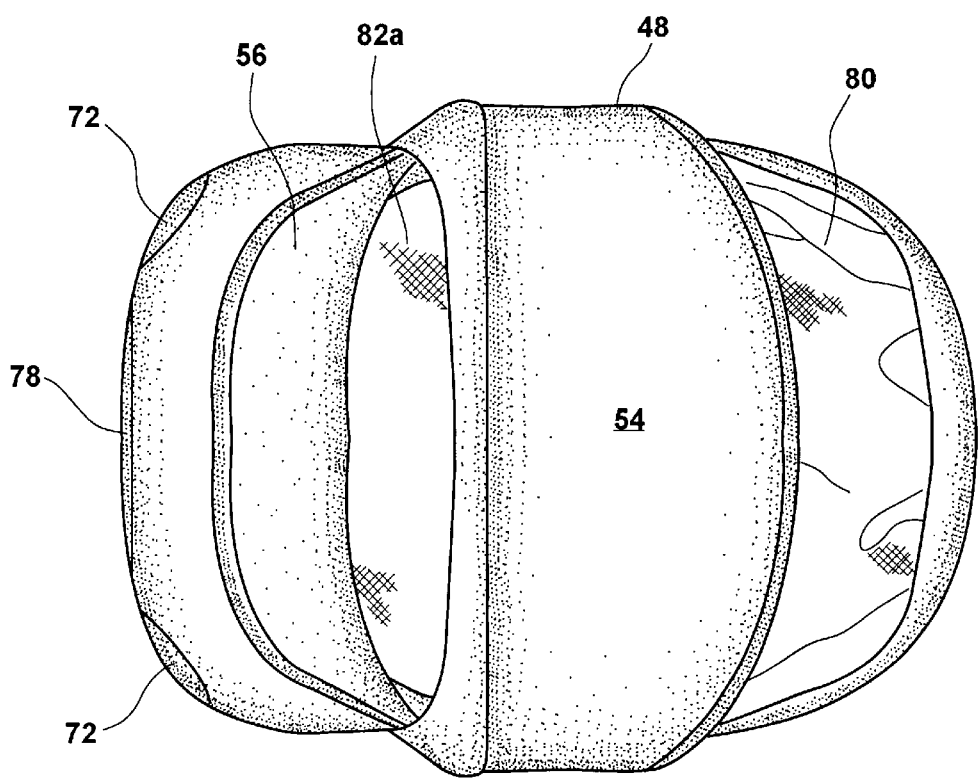
FIG. 28 shows a top view of the cover with inner cover exposed.

FIG. 28 shows a top view of the cover with front window 82a and the rear window 80 of the inner cover 60 exposed. With the center section 54 properly positioned, the zipper 94 which closes the central opening 90 is not visible.

Figure 29:
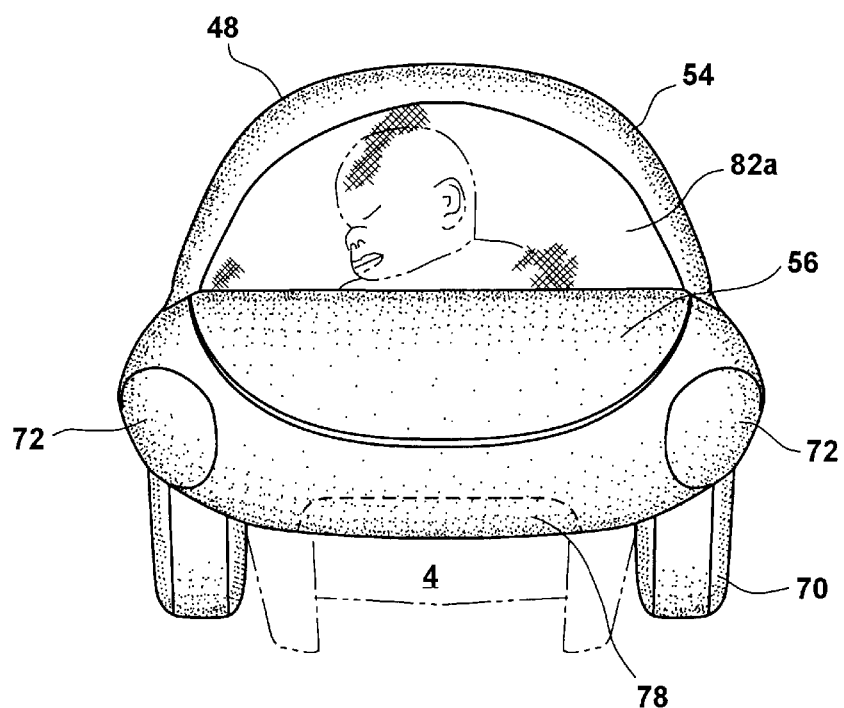
FIG. 29 shows a front view of the embodiment of FIG. 23 with the sun visor of the outer cover partially opened to reveal the mesh of the inner cover.

FIG. 29 shows a front view of the embodiment of FIG. 23 with the sun visor flap 56 of the outer cover 50 moved into a partially open position to reveal the mesh of the inner cover 60 forming the front window 82a. Also shown is a representation of a child within the carrier and the ability of the user to readily see the child. If sun becomes a problem, the sun visor flap 56 can be placed back up and attached, typically with a hook and loop fastener, to cover the child's face.

Figure 30:
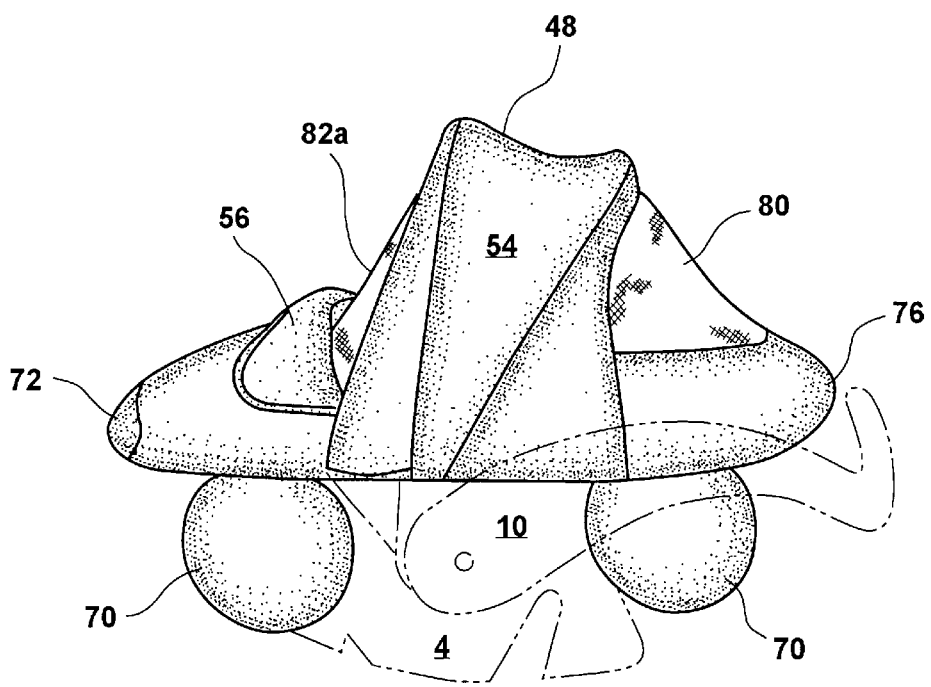
FIG. 30 shows a side view of the embodiment of FIG. 28.

FIG. 30 shows a side view of the embodiment of FIG. 28 with the weather flap 52 completely retracted into the pocket 76 to expose the rear window 80, and the sun visor flap 56 folded down to expose the front window 82a.

Thus there is disclosed an improved all weather protective carrier cover/activity center. Those skilled in the art will appreciate numerous modifications which can be made without departing from the scope and spirit of the present invention. The appended claims are intended to cover such modifications.

What is claimed is:

1. A protective cover for mounting on an infant carrier having a handle and protecting an infant from the elements, the protective cover comprising:
    a cover having a perimeter configured for wrapping around and holding the cover to the carrier; and
    a channel formed therein for receiving a support member to hold the cover above the carrier independent of the handle, and wherein the channel is adapted to receive a sun visor support member of an infant carrier on which the cover is mounted.

2. The protective cover according to claim 1, wherein the channel is an openable channel.

3. The protective cover according to claim 1, wherein the channel is openable along the length thereof to receive a support member attached to the carrier.

4. The cover according to claim 3, wherein the openable channel further comprises hook and loop fasteners.

5. The cover according to claim 1, wherein the cover comprises an outer cover layer and an inner cover layer.

6. The cover according to claim 5, wherein the inner cover layer comprises a plurality of mesh windows.

7. The cover according to claim 5, wherein the outer cover layer comprises a weather flap and a sun visor flap.

8. The cover according to claim 7, wherein the cover further comprises a zipper for closing the central opening.

9. The cover according to claim 5 wherein the cover further comprises a central opening.

10. The cover according to claim 1, further comprising at least one attachment means for securing toys adjacent the channel.

11. The cover according to claim 1, further comprising at least one flexible support spaced apart from the channel for holding the cover above the carrier.

12. The cover according to claim 11, wherein at least one flexible support is spaced forward of the channel and at least one flexible support is spaced rearward of the channel.

13. The cover according to claim 11, wherein the at least one flexible support comprises plastic tubing.

14. A protective cover for mounting on an infant carrier having a handle and protecting an infant from the elements, the protective cover comprising:

a cover having a perimeter configured for wrapping around and holding the cover to the carrier; and a channel formed therein for receiving a support member to hold the cover above the carrier independent of the handle, wherein the cover comprises a weather flap and a mesh window disposed beneath the weather flap when the weather flap is in a closed position, and a sun visor flap and a mesh window disposed beneath the sun visor flap when the sun visor flap is in a closed position.

15. The cover according to claim 14, wherein the sun visor flap has a first open position wherein the sun visor flap exposes one mesh window and a second open position wherein the sun visor flap exposes two mesh windows.

16. The cover according to claim 14, wherein the cover further comprises a retention means for holding the weather flap in an open position.

17. The cover according to claim 14, wherein the cover has a pocket for receiving the weather flap when the weather flap is in an open position.

18. The cover according to claim 14, wherein the cover has a pocket for receiving the sun flap when the sun flap is in an open position.

19. A protective cover for mounting on an infant carrier having a handle and protecting an infant from the elements, the protective cover comprising:

a cover having a perimeter configured for wrapping around and holding the cover to the carrier; and a channel formed therein for receiving a support member to hold the cover above the carrier independent of the handle, wherein the cover comprises a plurality of straps configured for mounting around a support member of the carrier for holding toys inside the cover.

20. The cover according to claim 19, wherein the straps extend around the channel.

21. A method for holding a cover on a carrier, the method comprising;

selecting a carrier having a handle;

selecting a cover having a perimeter and a sun visor support member;

mounting the cover perimeter about the carrier to hold the cover to the carrier; and positioning the survisor support member within the cover to hold the cover above the carrier independent of the handle of the carrier.

22. The method according to claim 21, wherein the method comprises selecting a cover having a channel formed therein and disposing the sun visor support member of the carrier in the channel.

23. The method according to claim 21, wherein the method comprises selecting a cover having an openable channel formed therein, opening the channel, disposing the sun visor support member of the carrier in the channel, and closing the channel.

* * * * *